United States Patent
Furuya et al.

(10) Patent No.: US 11,407,114 B2
(45) Date of Patent: Aug. 9, 2022

(54) ARTICLE CONVEYING SYSTEM

(71) Applicant: FANUC CORPORATION, Yamanashi (JP)

(72) Inventors: Yoshitake Furuya, Yamanashi (JP); Keisuke Suga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 155 days.

(21) Appl. No.: 17/088,894

(22) Filed: Nov. 4, 2020

(65) Prior Publication Data

US 2021/0178599 A1    Jun. 17, 2021

(30) Foreign Application Priority Data

Dec. 16, 2019   (JP) .............................. JP2019-226302

(51) Int. Cl.
*B25J 9/16* (2006.01)
*B65G 51/03* (2006.01)
*B65G 54/02* (2006.01)
*B25J 13/08* (2006.01)
*B65G 47/90* (2006.01)

(52) U.S. Cl.
CPC ............ *B25J 9/1694* (2013.01); *B25J 9/1653* (2013.01); *B25J 13/085* (2013.01); *B65G 51/03* (2013.01); *B65G 54/02* (2013.01); *B65G 47/901* (2013.01)

(58) Field of Classification Search
CPC ...... B25J 9/1694; B25J 9/1653; B25J 13/085; B25J 9/1679; B25J 9/0093; B65G 51/03; B65G 54/02; B65G 47/901; G05B 2219/37357; G05B 2219/37373; G05B 19/042; Y02P 90/02; B65D 19/40
See application file for complete search history.

(56) References Cited

U.S. PATENT DOCUMENTS

| | | | | |
|---|---|---|---|---|
| 4,498,404 A | * | 2/1985 | Sadeh | D05B 21/00 112/470.07 |
| 2012/0082516 A1 | | 4/2012 | Yamamoto et al. | |
| 2018/0340819 A1 | | 11/2018 | Taira | |

FOREIGN PATENT DOCUMENTS

| | | | |
|---|---|---|---|
| CN | 1611282 A | * | 5/2005 |
| EP | 2 437 290 A1 | | 4/2012 |
| JP | 2010-083591 A | | 4/2010 |
| JP | 2012-076877 A | | 4/2012 |
| JP | 2018-200225 A | | 12/2018 |

* cited by examiner

*Primary Examiner* — Robert T Nguyen
*Assistant Examiner* — Dylan M Katz
(74) *Attorney, Agent, or Firm* — Maier & Maier, PLLC

(57) ABSTRACT

An article conveying system includes a tray that is disposed on a floor surface and on which an article to be conveyed is mounted, a robot provided with a force sensor that detects an external force, a frictional force reduction device provided in at least one of the floor surface or the tray, to adjust a frictional force between the floor surface and the tray, and a controller that controls the robot to apply a lateral load to the tray and thereby slide the tray on the floor surface, and controls the frictional force reduction device based on a magnitude of the external force in a direction of the lateral load that is detected by the force sensor when the lateral load is applied.

6 Claims, 6 Drawing Sheets

ARTICLE CONVEYING SYSTEM

CROSS-REFERENCE TO RELATED APPLICATIONS

This application is based on and claims priority to Japanese Patent Application No. 2019-226302 filed on Dec. 16, 2019, the content of which is incorporated herein by reference in its entirety.

FIELD

The present disclosure relates to an article conveying system.

BACKGROUND

To convey an article in excess of a weight capacity by a collaborative robot, the article is mounted on a tray placed on a floor surface, and a lateral load is applied to the tray by the collaborative robot to slide the tray on the floor surface. To slide the tray on the floor surface, it is necessary to apply the lateral load that is larger than a frictional force generated between the floor surface and the tray. The frictional force generated between the floor surface and the tray fluctuates depending on a state of the floor surface or a back surface of the tray and whether the force is of static or dynamic friction.

SUMMARY

An aspect of the present disclosure is an article conveying system including a tray that is disposed on a floor surface and on which an article to be conveyed is mounted, a robot provided with a force sensor that detects an external force, a frictional force reduction device provided in at least one of the floor surface or the tray, to adjust a frictional force between the floor surface and the tray, and a controller that controls the robot to apply a lateral load to the tray and thereby slide the tray on the floor surface, and controls the frictional force reduction device based on a magnitude of the external force in a direction of the lateral load that is detected by the force sensor when the lateral load is applied.

DETAILED DESCRIPTION OF EMBODIMENTS

Hereinafter, description will be made as to an article conveying system 1 according to an embodiment of the present disclosure, with reference to the drawings.

Figure 1:
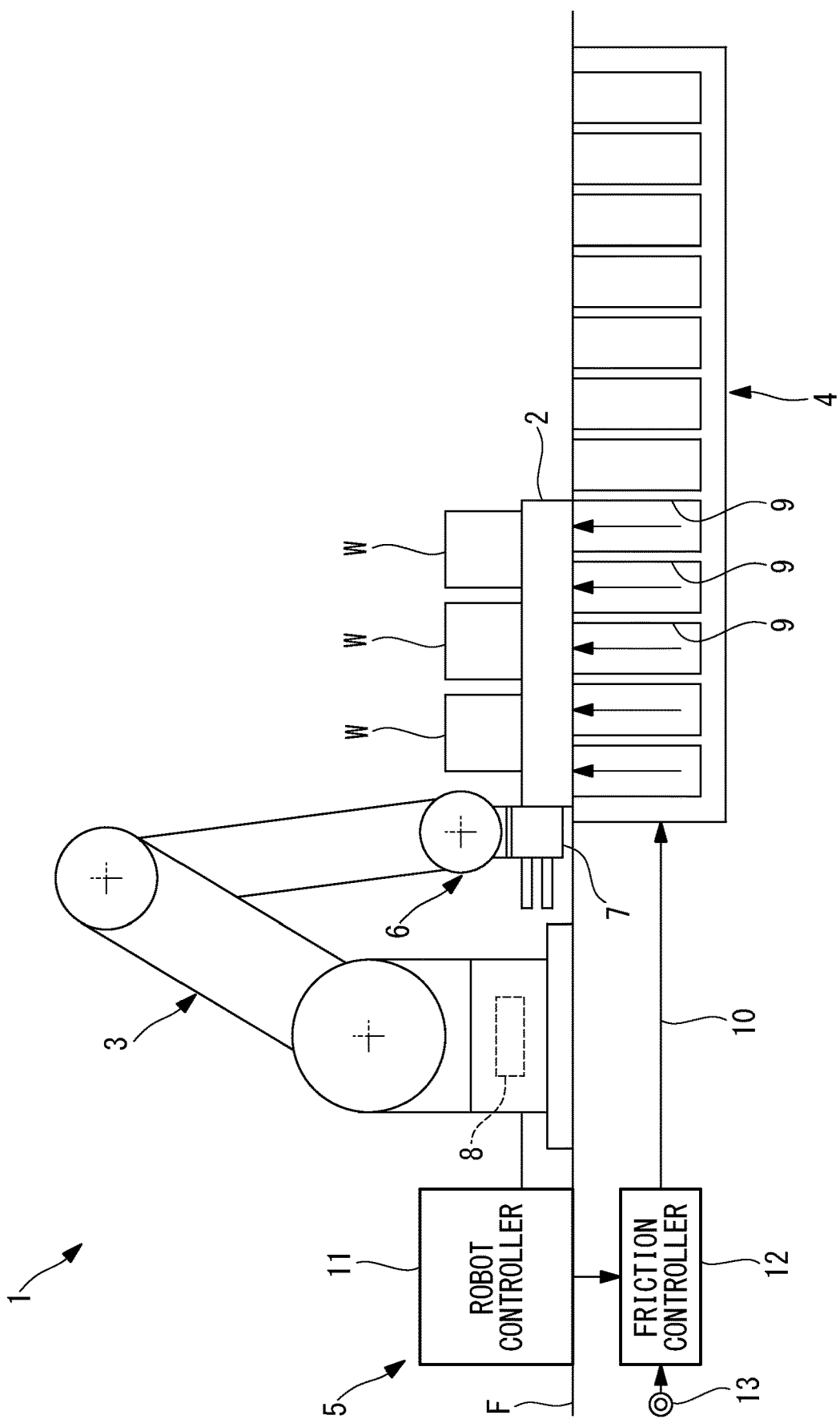
FIG. 1 is an overall configuration diagram of an article conveying system according to an embodiment of the present disclosure, and shows a state where a tray is disposed at a first position.

As shown in FIG. 1, the article conveying system 1 according to the present embodiment includes a tray 2 on which articles W are placed, a robot 3, a frictional force reduction device 4 installed on a floor surface F, and a controller 5 that controls the robot 3 and the frictional force reduction device 4.

The tray 2 is formed in a pallet shape including a flat bottom surface, an upper surface on which the articles W can be placed, and four side surfaces.

The robot 3 is, for example, a vertical 6-axis articulated robot, includes a wrist 6 provided with, at a tip thereof, a hand 7 with which an article W can be held, and also includes a force sensor 8 capable of detecting an external force. The force sensor 8 can detect contact of each part of the robot 3 with a person or an object in accordance with fluctuation of a detected value due to the contact, and can additionally detect a weight of an article W to be lifted with the hand 7, and a pushing force in pushing the article W with the wrist 6.

Figure 2:
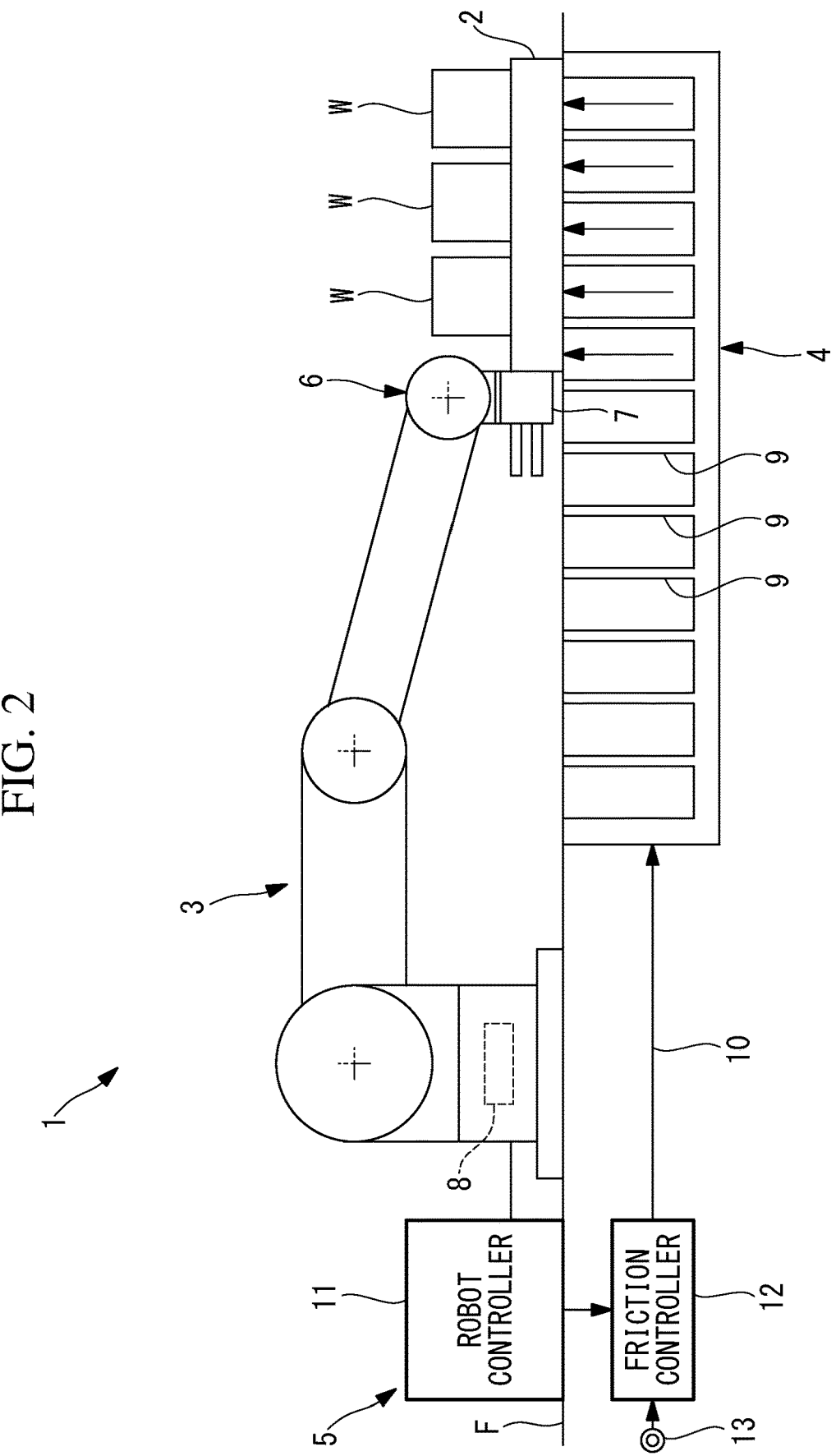
FIG. 2 is an overall configuration diagram showing a state where the tray is disposed at a second position in the article conveying system of FIG. 1.

The frictional force reduction device 4 includes, for example, discharge ports 9 opened in the floor surface F, pipes 10 connected to the respective discharge ports 9 and an air pressure source 13 that generates pressurized air (pressurized fluid) to be supplied to the pipes 10, over an entire conveying path of the articles W in the tray 2. For example, the conveying path is a linear path between a first position that is close to a position where the robot 3 is installed as shown in FIG. 1 and a second position that is away from the position where the robot 3 is installed as shown in FIG. 2.

The controller 5 includes a robot controller 11 that controls the robot 3, and a friction controller 12 that controls the frictional force reduction device 4. The robot controller 11 includes a processor and a memory.

The robot controller 11 controls the robot 3 to perform an operation of transferring the articles W onto the tray 2 in accordance with a program taught in advance. Furthermore, as shown in FIG. 1, the robot controller 11 controls the robot 3 so that the robot applies a lateral load to push, in a horizontal direction, a side surface of the tray 2 on which the articles W are mounted, and to slide the tray 2 on the floor surface F.

The robot controller 11 constantly monitors the external force by the force sensor 8 during the operation of the robot 3, and stops the robot 3 when an excessively large external force in excess of a first threshold is applied.

Furthermore, when performing a conveying operation of sliding the tray 2, the robot controller 11 outputs, for example, a signal indicating to do so to the friction controller 12 on the program.

Figure 3:
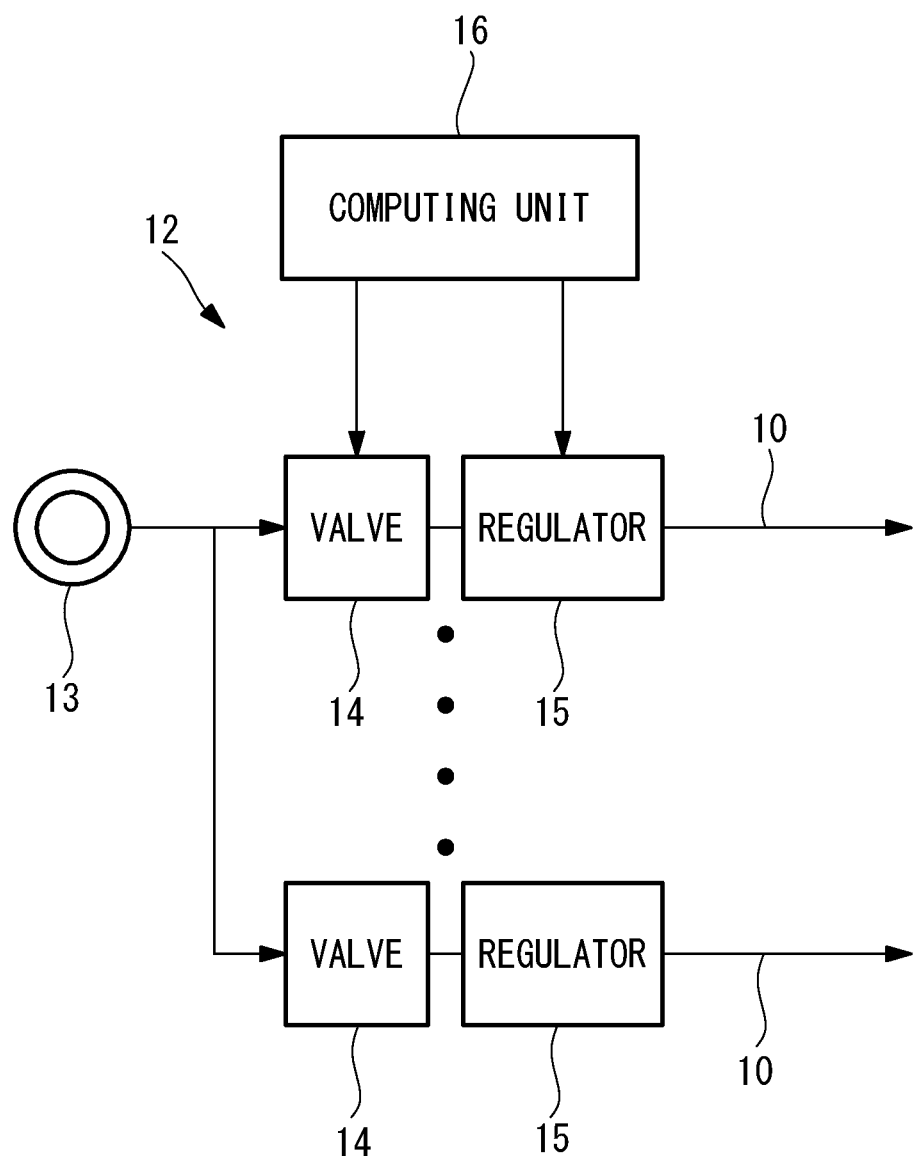
FIG. 3 is an explanatory view of a friction controller provided in the article conveying system of FIG. 1.

As shown in FIG. 3, the friction controller 12 includes valves 14 that switch the pipe 10 to supply the pressurized air from the air pressure source 13, regulators 15 capable of regulating a pressure of the pressurized air to be supplied to each pipe 10, and a computing unit 16 that controls these components. The computing unit 16 is composed of a processor and a memory.

A valve 14 and a regulator 15 may be provided in each pipe 10 so that discharge or stop of the pressurized air for each of the discharge ports 9 can be switched and the pressure of the pressurized air can be adjusted, or may be provided for each group including a plurality of discharge ports 9. The friction controller 12 receives positional information of the tray 2 from the robot controller 11. When the tray 2 moves, the discharge port 9 located below the tray 2 changes. Therefore, as the tray 2 advances, the discharge port 9 that discharges the pressurized air switches. That is, only the frictional force reduction device 4 in a region where the tray 2 is disposed is actuated.

Figure 4:
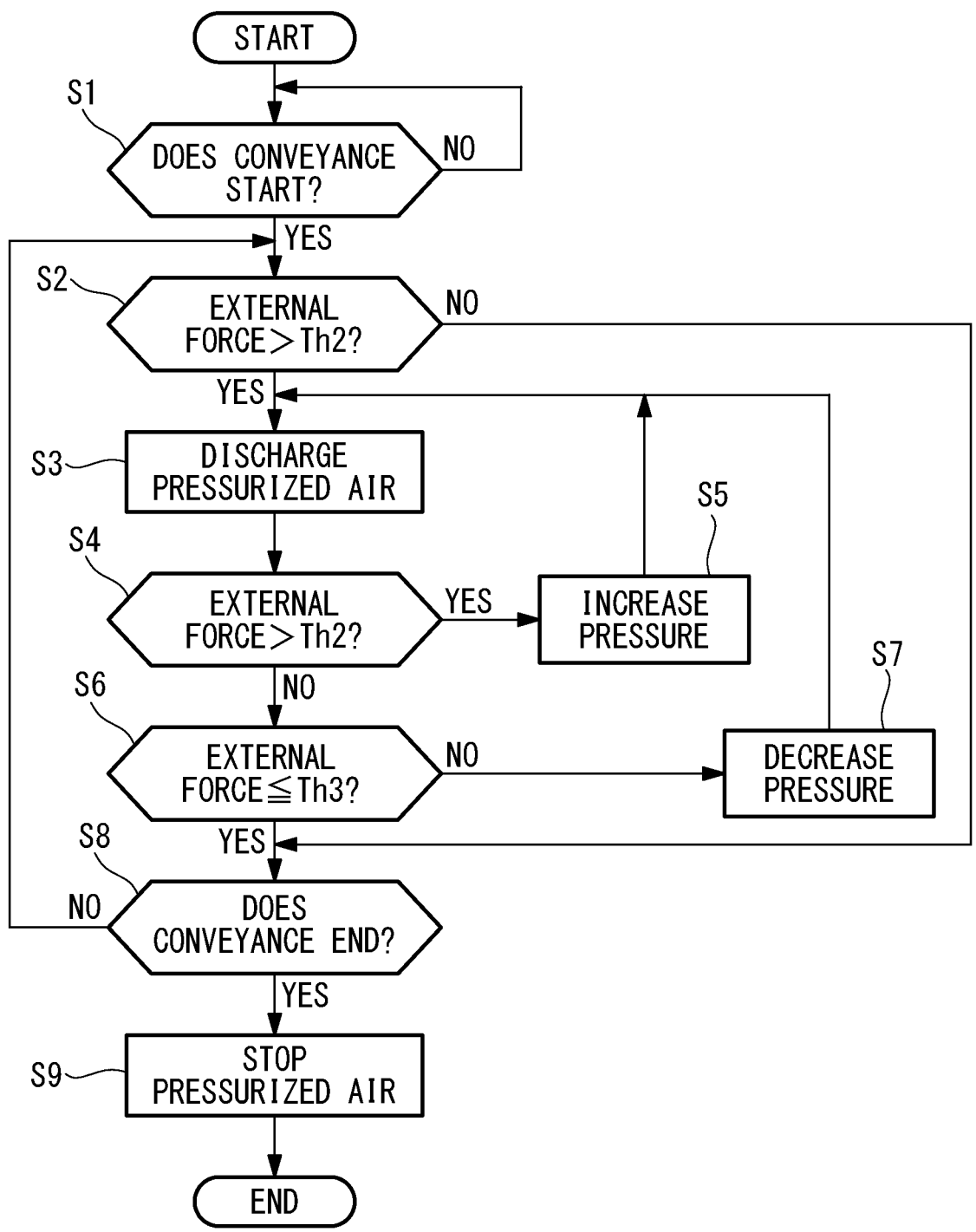
FIG. 4 is a flowchart explaining an operation of the friction controller of FIG. 3.

In the computing unit 16, as shown in FIG. 4, when a signal that notifies the conveying operation is input from the robot controller 11 (step S1), it is determined whether or not the external force in a direction of pushing the tray 2, detected by the force sensor 8 of the robot 3, is in excess of a second threshold Th2 that is smaller than the first threshold (step S2). Then, in a case where it is determined that the external force in the direction of pushing the tray 2 is in excess of the second threshold Th2, the computing unit 16 controls the valve 14 to discharge the pressurized air from the discharge port 9 located below the tray 2 (step S3).

Furthermore, in a case where the external force is maintained in a state of being in excess of the second threshold Th2 even if the pressurized air is discharged (step S4), the computing unit 16 controls the regulator 15 to increase the pressure of the pressurized air to be discharged from the discharge port 9 (step S5). On the other hand, in a case where the valve 14 and the regulator 15 are controlled so that the external force is less than or equal to the second threshold Th2, the computing unit 16 determines whether or not the external force is less than or equal to a third threshold Th3 that is smaller than the second threshold Th2 (step S6).

The computing unit 16 controls the regulator 15 so that the external force is in excess of the third threshold Th3 and is less than or equal to the second threshold Th2, to increase or decrease the pressure of the pressurized air to be discharged from the discharge port 9 (from step S3 to S7). Then, the computing unit 16 determines whether or not the conveyance ends in a case where the external force is less than or equal to the third threshold Th3, for example, because the tray 2 stops at the second position (step S8), and the computing unit stops the discharge of the pressurized air in a case where the conveyance ends (step S9). In a case where the conveyance does not end, the computing unit repeats the steps from the step S2.

Furthermore, the computing unit 16 repeats the steps from the step S8 in a case where the external force in the direction of pushing the tray 2 is equal to or less than the second threshold Th2.

Hereinafter, description will be made as to operations of the article conveying system 1 according to the present embodiment including such a configuration.

To convey the article W by the article conveying system 1 according to the present embodiment, the article W is mounted on the tray 2 disposed on the floor surface F at the first position. The mounting of the article W may be performed by the robot 3 or by another transfer device.

When the robot controller 11 controls the robot 3 to perform the conveying operation in accordance with the program, for example, as shown in FIG. 1, the wrist 6 of the robot 3 comes in contact with one of the side surfaces of the tray 2, to push the contacted side surface. At this time, the external force received from the tray 2 by the wrist 6 of the robot 3 is detected by the force sensor 8 of the robot 3.

A value of the detected external force in a conveying direction is sent to the computing unit 16 of the friction controller 12, to determine whether or not the value of the external force is larger than the second threshold Th2. In a case where the external force is not in excess of the second threshold Th2, the conveying operation by the robot 3 is continued.

On the other hand, in a case where the value of the external force in the conveying direction is in excess of the second threshold Th2, the computing unit 16 controls the valve 14 to discharge the pressurized air to a space between the tray 2 and the floor surface F from the discharge port 9 disposed below the tray 2.

The pressurized air is discharged from the discharge port 9, to generate a force to raise the tray 2. Consequently, a frictional force between the tray 2 and the floor surface F is reduced.

In a case where the frictional force is not sufficiently reduced even after the pressurized air is discharged, the external force is maintained in the state of being in excess of the second threshold Th2. Therefore, the computing unit 16 controls the regulator 15 to increase the pressure of the pressurized air to be discharged from the discharge port 9. Then, in a case where the frictional force is sufficiently reduced, the external force becomes less than or equal to the second threshold Th2, and the tray 2 starts sliding on the floor surface F.

While the tray 2 stands still, static friction is generated. Therefore, unless the pressure of the pressurized air is increased and the frictional force is sufficiently reduced, the tray 2 cannot be moved. On the other hand, once the tray starts moving, dynamic friction is generated. Therefore, if the pressure of the pressurized air remains to be large, the external force applied by the robot 3 rapidly decreases. Consequently, the computing unit 16 determines whether or not the external force is less than or equal to the third threshold Th3 that is smaller than the second threshold Th2. In a case where the external force is less than or equal to the third threshold Th3, the computing unit controls the regulator 15 to decrease the pressure of the pressurized air.

Consequently, there is an advantage that the tray 2 is pushed with the pushing force in a range between the third threshold Th3 and the second threshold Th2 and the article W can be stably conveyed.

Furthermore, in the present embodiment, the friction controller 12 switches the valve 14 to switch the discharge port 9 from which the pressurized air is discharged, based on the positional information of the tray 2 that is received from the robot controller 11.

This allows the frictional force between the tray 2 being conveyed and the floor surface F to be maintained in a reduced state, and the pressurized air is discharged only from the required discharge port 9, so that power can be saved.

Furthermore, a state of the floor surface F varies. Therefore, even when the pushing force fluctuates, the regulator 15 is controlled to adjust the pressure of the pressurized air discharged from the discharge port 9, and the frictional force between the tray 2 and the floor surface F can be maintained in a predetermined range.

On the other hand, in a case where the pushing force rapidly increases in excess of the first threshold in middle of conveyance, it is supposed that the robot 3 has come in contact with an object nearby, and the robot controller 11 stops the robot 3.

With the pushing force maintained at a value that is larger than the third threshold Th3 and less than or equal to the second threshold Th2, the frictional force between the tray 2 and the floor surface F is maintained, and hence the tray 2 can be stopped by stopping the robot 3.

Note that in the present embodiment, the frictional force reduction device 4 is provided in the floor surface F. Alternatively, the frictional force reduction device may be provided on a tray 2 side. In a case where the frictional force reduction device 4 is provided on the tray 2 side, there is a disadvantage that the pipe 10, through which the pressurized air is supplied, is a movable pipe. However, the discharge port 9, through which the pressurized air is discharged, does not have to be switched, which can simplify control. Alternatively, frictional force reduction devices 4 may be provided in both the tray 2 and the floor surface F, respectively.

Additionally, in the present embodiment, the frictional force reduction device 4 has been described in discharging the pressurized air. Alternatively, an arbitrary fluid to be discharged may be employed. Furthermore, in place of pushing the tray 2 in a raising direction with the discharged fluid, the tray 2 may be pushed in the raising direction with magnetic repulsive force.

In this case, for example, a permanent magnet with one magnetic pole (e.g., an N-pole) facing downward may be disposed on a back surface of the tray 2, and an electromagnet may be disposed on the floor surface F. The electromagnet is energized to generate, on the floor surface F, the same magnetic pole (e.g., the N-pole) as in the permanent magnet of the tray 2, so that the magnetic repulsive force can be generated between the magnets. In place of the permanent magnet, an electromagnet may be disposed on the tray 2 side.

Additionally, in the present embodiment, the robot 3 may be provided with a camera to detect a shape of the article W to be mounted and a vacant space on the tray 2. Furthermore, the robot controller 11 may dispose the article W held with the hand 7 in the vacant space on the tray 2 while adjusting an orientation of the article W.

Figure 5:
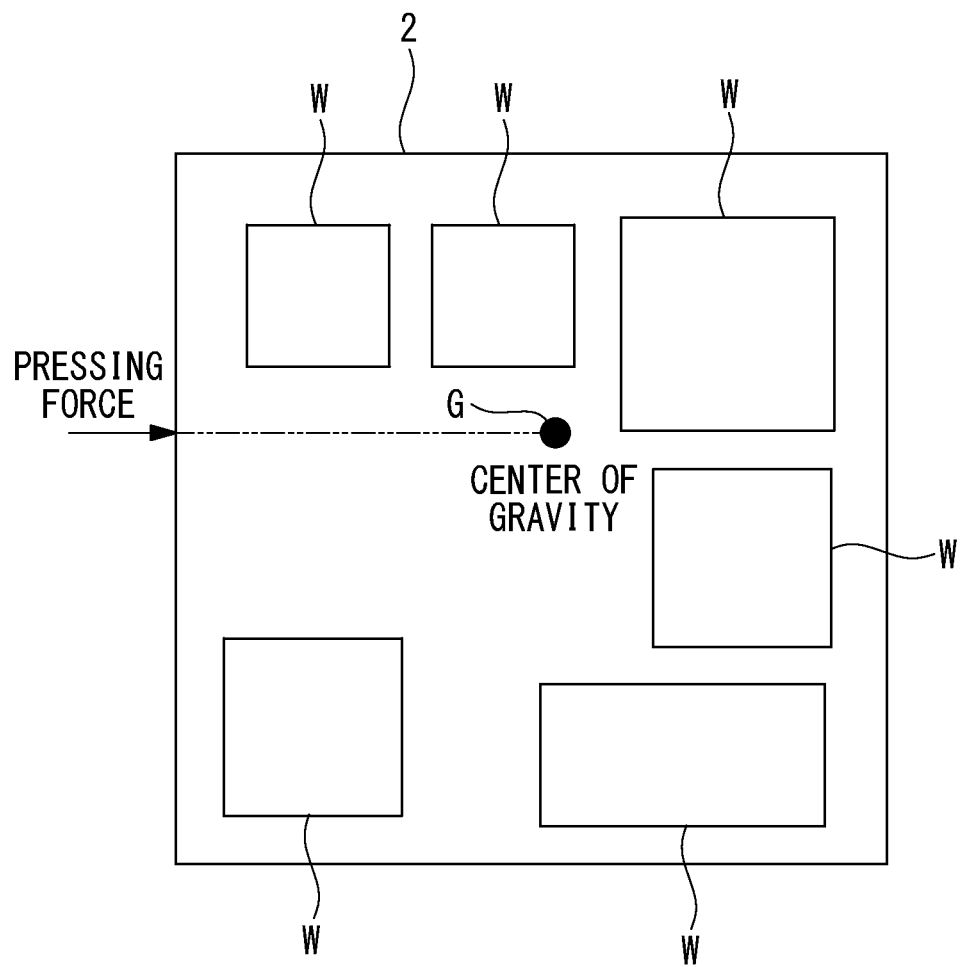
FIG. 5 is a schematic plan view of a modification of the article conveying system of FIG. 1, and shows a center of gravity of an article on the tray and a position to be pushed by a robot.

In this case, as shown in FIG. 5, it is preferable that the robot controller 11 calculates a position of center of gravity G of a group of articles W in a horizontal direction, that are mounted on the tray 2, and controls the robot 3 so as to push the tray 2 at a position on a vertical plane passing the position of center of gravity G.

This allows the tray 2 to slide straight on the floor surface F.

The position of center of gravity G is calculated, for example, as follows.

First, the position of center of gravity G of each article W is calculated from the weight of the article W and the shape of the article W that are detected by the force sensor 8 when the robot 3 holds and raises the article W, and a coordinate of the position of center of gravity G when the article W is placed on the tray 2 is associated with the weight and stored. Then, the robot controller 11 calculates the position of center of gravity G of the group of the articles W in the horizontal direction from the stored weights of the respective articles W and the stored coordinate of the position of center of gravity G, after all the articles W are mounted on the tray 2.

Figure 6:
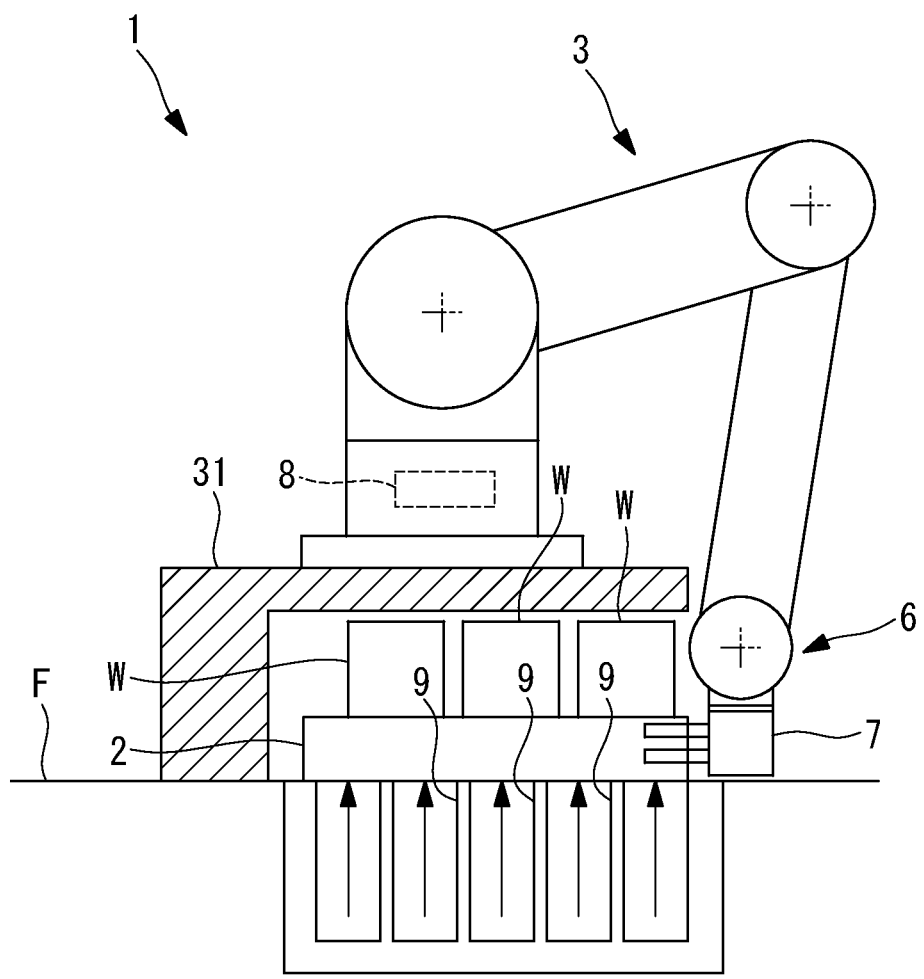
FIG. 6 is a side view showing another modification of the article conveying system of FIG. 1.

Furthermore, in the present embodiment, it has been described that the article is conveyed from the first position that is close to the position where the robot 3 is installed to the second position that is away from the position where the robot 3 is installed, but the present invention is not limited to this case. For example, as shown in FIG. 6, a space may be provided below a base 31 of the robot 3, and in the space, a conveying path through which the tray 2 is moved (in a direction orthogonal to a paper surface) may be employed.

The invention claimed is:

1. An article conveying system, comprising:
   a tray disposed on a floor surface and on which an article to be conveyed is mounted,
   a robot provided with a force sensor that detects an external force,
   a frictional force reduction device provided in at least one of the floor surface or the tray, the frictional force reduction device adjusts a frictional force between the floor surface and the tray, and
   a controller that controls the robot to apply a lateral load to the tray and thereby slide the tray on the floor surface, and controls the frictional force reduction device based on a magnitude of the external force in a direction of the lateral load that is detected by the force sensor when the lateral load is applied.

2. The article conveying system according to claim 1, wherein the frictional force reduction device supplies a pressurized fluid to a space between the floor surface and the tray.

3. The article conveying system according to claim 1, wherein the frictional force reduction device generates magnetic repulsive force between the floor surface and the tray.

4. The article conveying system according to claim 1, wherein the controller controls the frictional force reduction device so that the magnitude of the external force in the direction of the lateral load that is detected by the force sensor is maintained in a predetermined range.

5. The article conveying system according to claim 1, wherein the frictional force reduction device comprises a plurality of frictional force reduction devices distributed and arranged along a conveying path of the article on the floor surface, and
   the controller actuates only part of the frictional force reduction devices in a region where the tray is disposed.

6. The article conveying system according to claim 1, wherein the controller calculates a position of a center of gravity of the tray in a horizontal direction in a state where the article is mounted on the tray, and controls the robot to push the tray at a position on a vertical plane passing the calculated position of the center of gravity.

* * * * *